Feb. 28, 1928.
A. M. SOSA ET AL
1,660,585
CLUTCHING MECHANISM
Filed June 13, 1927
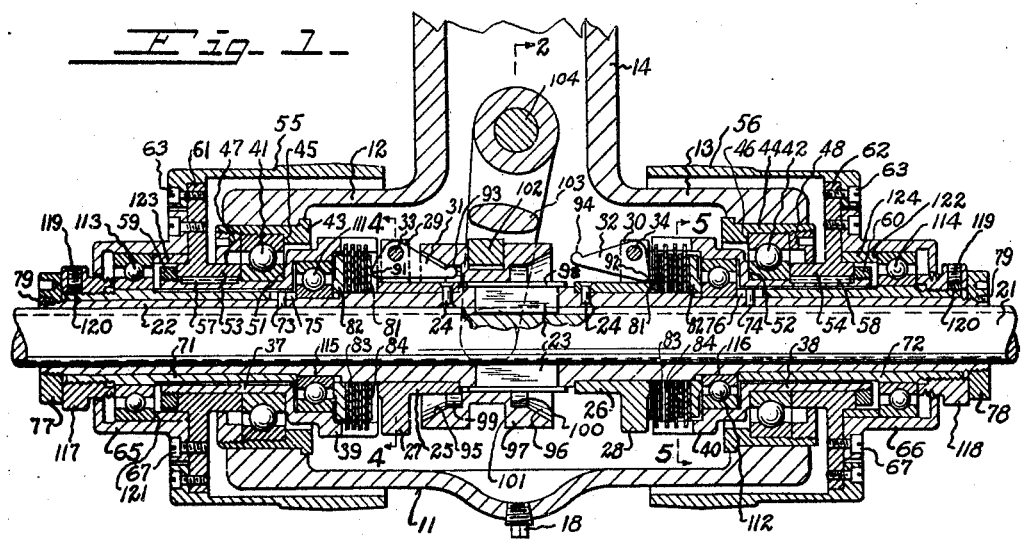
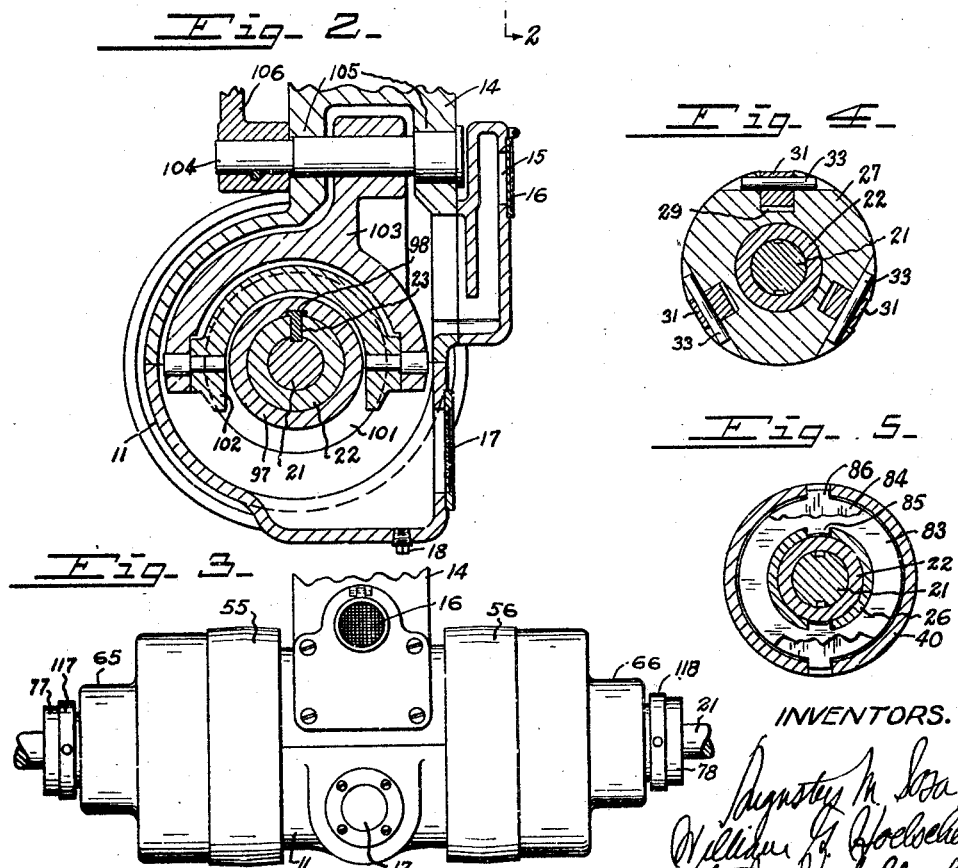
INVENTORS.

Patented Feb. 28, 1928.

1,660,585

UNITED STATES PATENT OFFICE.

AUGUSTUS M. SOSA, OF CINCINNATI, AND WILLIAM G. HOELSCHER, OF NORWOOD, OHIO, ASSIGNORS TO THE AMERICAN TOOL WORKS COMPANY, OF CINCINNATI, OHIO, A CORPORATION OF OHIO.

CLUTCHING MECHANISM.

Application filed June 13, 1927. Serial No. 198,425.

Our invention relates to clutching mechanism, and is exemplified as applied in reversing mechanism employable for instance in metal drilling machinery for rotating the tool-spindle in reverse directions, for example, in tapping operations and the like, and is further exemplified in such reversing mechanism for sensitive drills employing a belt drive for the rotations of the tool-spindle. Desiderata of such reversing mechanisms are that the reversals of rotation shall be instantly effected; that quiet operation shall be assured; that shocks in the reversals shall be avoided, and that the clutch mechanism shall be effective for transmitting rotations at high speeds.

It is the object of our invention to provide a novel association of means for rotatively supporting the outer power transmitting member, instanced as a pulley; further, to provide novel means for adjusting the clutch; further, to provide novel means in reversing mechanism of the character mentioned whereby the reversing clutches are adjusted from the outside of the enclosing parts for the reversing mechanism in order that adjustments of the respective clutches may be conveniently made; and the invention will be further readily understood from the following description and claims, and from the drawings, in which latter:

Fig. 1 is a vertical axial section of our improved device.

Fig. 2 is a vertical cross-section of the same, taken in the plane of the irregular line 2—2 of Fig. 1.

Fig. 3 is a rear elevation of our improved device.

Fig. 4 is a cross-sectional detail of the same, taken in the plane of the line 4—4 of Fig. 1, showing the mounting of the clutch actuating levers; and, Fig. 5 is a cross-sectional detail of the same, taken in the plane of the line 5—5 of Fig. 1, and partly broken away, showing the mounting of the clutch disks.

A housing 11 has laterally projecting shells 12, 13, and is exemplified at the lower end of a bracket 14, which in practice may be a rear bracket depending from a usual drill-slide of a usual drilling machine.

The housing may be an oil containing lubricant casing, in which the friction clutches and operating devices therefor are located. This lubricant casing may have a filling port 15, normally closed by a closure 16. It may also have an observation lens 17 comprising a transparent plate, through which the level of the oil in the lubricant casing may be observed. The casing may also be provided with a draining plug 18.

21 is a shaft, which may be instanced as the usual cross-shaft extending lengthwise of the drill-arm in a drilling machine, suitably driven. A sleeve 22 extends lengthwise about the shaft, and is exemplified as freely translatable lengthwise thereon, which translation may be throughout the adjustments of the drill-slide along the drill-arm, the sleeve being rotatable with the shaft, as by means of spline groove and key connections 23 between the sleeve and the shaft. Collars 25, 26, are secured to the sleeve, as by pins 24 and are provided with flanges 27, 28, which have slots 29, 30, therein at suitable points around their circumferences, in which levers 31, 32, are located, the levers being pivoted on pins 33, 34, received through holes in said respective flanges.

The respective friction clutches comprise sleeves 37, 38, journaled about the respective ends of the sleeve 22, and comprise cups 39, 40, in which the friction disks are received. Ball-bearings 41, 42, are located between said pair of sleeves and the respective ends of the shells 12, 13, whereby said sleeves are journaled in the respective ends of the housing. The outer raceways of said ball-bearings are held endwise in bushings 43, 44, in the respective ends of said housing between shoulders 45, 46, in said bushings and spanner nuts 47, 48, threaded in the outer threaded ends of said bushings.

The inner raceways of said ball-bearings are held endwise between annular shoulders 51, 52, in said pair of sleeves and the hubs 53, 54, of motion transmitting members, exemplified as pulleys 55, 56. These hubs have key connections 57, 58, with said pair of sleeves, the hubs and inner raceways of said ball-bearings being fixed endwise between said shoulders and nuts 59, 60, threaded about the outer threaded ends of said pair of sleeves. The hubs have flanges 61, 62, to which the shells or peripheral portions of the pulleys 55, 56, are secured, as by screws 63. These pulleys are exemplified as the motion transmitting parts for transmitting reverse directions of rotation, but may if desired, be motion transmitting parts having different details, as for instance teeth for forming gears, for instance bevel gears, or gearing of other form. Said motion transmitting parts may also include outwardly extending cups 65, 66, secured to the flanges 61, 62, by screws 67.

Intermediate sleeves 71, 72, are located between the inner sleeve 22 and the sleeves 37, 38. The intermediate sleeves are adjustable lengthwise on the respective ends of the inner sleeve 22, and rotate with said inner sleeve, as by providing said inner sleeve with pins 73, 74, received in slots 75, 76, in the sleeves 71, 72 there being a suitable number of these pins and slots about the circumferences of the sleeves. Outward axial movements of the sleeve 71, 72, are limited by means of nuts 77, 78, threaded to the respective ends of the sleeve 22, and fixed thereto by means of set screws 79. These nuts form collars or stops for limiting outward axial movements of the sleeves 71, 72.

Each of the clutches comprises end abutment disks 81, 82, and intermediate disks 83, 84. The friction disks are received in the cups 39, 40, of the sleeves 37, 38, the disks 83 having tongue and groove connections 85 with the respective collars 25, 26, which are respectively fixed to the inner sleeve 22, the disks 84 having tongue and groove connections 86 with the annular cups 39, 40, of the outer sleeves 37, 38, respectively. When these disks are pressed toward each other, friction clutch connection is made between the inner sleeve and the outer sleeve for rotating the pulley fixed to the outer sleeve.

The laterally extending shelves or ends of the housing are received in the inwardly extending shells of the pulleys 55, 56, the pulleys being received about the ball-bearings therefor and the clutches for the same.

The respective clutch levers 31, 32, are provided with contact-faces 91, 92, arranged to engage one of the contact disks 81, to press the disks of the respective friction clutches toward each other. Recession of the respective contact faces from the respective friction disks releases the friction clutch and permits the pulley to rotate freely about the inner sleeve. The respective clutch levers are provided with heels 93, 94. The heels of the clutch levers of the respective clutches project toward each other and are arranged to be engaged by inner conical faces 95, 96, on a shiftable collar 97 shiftable axially along the inner sleeve 22 and having spline groove and key connection 98 therewith. The inclined or conical faces of said collar terminate in cylindrical faces 99, 100, at their inner ends, with which the heels of the levers respectively coact when the shifting collar has been shifted to its full extent for full engagement of the clutch and for maintaining the clutch in engaged position.

The shifting collar is provided with an annular groove 101 in which a shoe 102 is received, the shoe having articulating connection with a fork 103 fixed to a rock-shaft 104 journaled in bearings 105 in the housing. A control arm 106 is fixed to said rock-shaft, and has suitable connection made therewith for operating the same and thereby controlling the position of the shifting collar 97 for engaged relation of either clutch or for neutral relation of the collar and disengaged relation in both clutches. Suitable means may be provided for maintaining the control arm in actuated positions for desired relations in the clutches.

Ball-bearings 111, 112, are located between the respective sleeves 37, 38, and the sleeve 22, said ball-bearings being located in the cups 39, 40, of said sleeves. Ball-bearings 113, 114, are located between the cups 65, 66, and the sleeves 71, 72. The inner raceways of the ball-bearings 111, 112, are axially slidable on annular faces 115, 116, on the sleeve 22. The outer raceways of the ball-bearings 111, 112, are received within the inner peripheries of the cups 39, 40, and are permitted to move endwise therealong to compensate for axial adjustments of the inner raceways of said last-named ball-bearings. Said last-named inner raceways form anchors for the outer disks of the respective friction clutches, and are adjustable axially for positioning the same with relation to the pivot points of the clutch levers 31, 32.

Nuts 117, 118, are threaded to the outer threaded ends of the sleeves 71, 72. Outward axial movements of the nuts 117, 118, are limited by the collars 77, 78. The threads at the outer ends of the sleeves 71, 72, are preferably left-handed threads, or opposite to the direction of the threads at the outer ends of the sleeve 22, for insuring locked relations between the nuts 117, 118, and the collars 77, 78, when said nuts have been adjusted.

The nuts 117, 118, are, after adjustment, fixed to the respective sleeves 71, 72, as by set screws 119, acting on threaded clamping shoes 120, for clamping said nuts to said sleeves.

The inner raceways of the ball-bearings 113, 114, are positioned in outward axial direction by the inner ends of the nuts 117, 118, and the outer raceways of said ball-bearings are positioned in inward direction by shoulders 121, 122, formed by rings 123, 124, between said outer raceways and the flanges 61, 62.

If it is desired to adjust the friction clutches, the set-screws 119, are released, and the nuts 117, 118, are respectively rotated in one direction or the other according to whether greater pressure or less pressure is to be exerted between the friction clutches. The rotation of these nuts varies the effective length of the sleeves 71, 72, for increasing or decreasing the distance between the collars 77, 78, forming shoulders at the outer ends of the sleeve 22, and the pivots 33, 34, of the clutch levers 31, 32, which pivots are located in the flanges 27, 28, fixed to the inner sleeve.

During such respective adjustments, the sleeves 71, 72, are moved axially inward or outward for adjusting the axial position of the inner raceways of the ball-bearings 111, 112, which inner raceways form anchors at the outer ends of the series of friction disks, toward which the friction disks are pressed upon operation of the clutch levers 31, 32, respectively in clutch engaging direction.

Having thus fully described our invention, what we claim as new, and desire to secure by Letters Patent, is:

1. In a device of the character described, the combination of an inner motion transmitting member provided at one end thereof with a shoulder, a sleeve thereabout and rotatable therewith, a disk friction clutch about the other end of said motion transmitting member comprising a friction applying member, elongating means for said sleeve for elongating said sleeve between said shoulder and said disk friction clutch for adjusting the normal space between the disks of said friction clutch, and a motion transmitting member rotatable about said sleeve, said disk friction clutch comprising disks respectively having operative connections with said respective motion transmitting members, said disk friction clutch arranged for rotatively connecting and disconnecting said motion transmitting members.

2. In a device of the character described, the combination of an inner motion transmitting member provided at one end thereof with a shoulder, a sleeve thereabout rotatable therewith and axially adjustable with relation thereto, a disk friction clutch about the other end of said motion transmitting member comprising a friction applying member on said motion transmitting member for said clutch, an outer motion transmitting member rotatable about said sleeve, a ball-bearing between said sleeve and said last-named motion transmitting member, and means at the outer end of said sleeve for axially adjusting said sleeve between said shoulder and said disk friction clutch and for axial movement of said sleeve in said ball-bearing, said disk friction clutch arranged for rotatively connecting and disconnecting said motion transmitting members.

3. In a device of the character described, the combination of an inner motion transmitting member provided with a shoulder, a sleeve rotatable therewith and axially adjustable with relation thereto, a disk friction clutch about said motion transmitting member comprising a flange member on said motion transmitting member and a complemental member rotatable about said sleeve, an outer motion transmitting member rotatable with said complemental member for forming a motion transmitting unit, means for effecting driving relation and release relation in said disk friction clutch for rotatively connecting and disconnecting said motion transmitting members, a ball-bearing between the clutch end of said motion transmitting unit and said first-named motion transmitting member, a ball-bearing between the other end of said motion transmitting unit and said sleeve, and adjusting means for said sleeve for axially adjusting said sleeve between said shoulder and said disk friction clutch arranged for adjusting said first-named ball-bearing on said first-named motion transmitting member and for axial movement of said sleeve in said second-named ball-bearing.

4. In a device of the character described, the combination of an inner motion transmitting member, a sleeve thereabout rotatable therewith and axially adjustable with relation thereto, an outer motion transmitting member about said sleeve, a disk friction clutch about said inner motion transmitting member comprising friction applying means on said inner motion transmitting member and friction disks rotatable respectively with said respective motion transmitting members, a ball-bearing between said motion transmitting members comprising an inner raceway which forms an anchoring part for said friction disks, said sleeve complemental to said inner raceway, and means for adjusting said sleeve endwise for adjusting said inner raceway toward and from said friction applying means.

5. In a device of the character described, the combination of an inner motion transmitting member, an outer motion transmitting member thereabout, a disk friction clutch about said first-named member at one end of said second-named member, said clutch comprising friction disks respectively rotatable with said respective motion transmitting members and friction applying means on said first-named member at one side of said disks, a ball-bearing between said members comprising an inner raceway forming an anchor for said disks at the other side of said disks, said second-named motion transmitting member formed as a cup received over said ball-bearing and said disks, a sleeve between said motion transmitting members, one end of which coacts with said inner raceway, a ball-bearing between the other end of said sleeve and said outer motion transmitting member, and means for causing relative axial adjustment between said sleeve and said first-named motion transmitting member for axially adjusting the distance between said friction applying means and said anchor.

6. In a device of the character described, the combination of an inner motion transmitting member, an outer motion transmitting member thereabout, a disk friction clutch about said first-named member at one end of said second-named member, said clutch comprising friction disks respectively rotatable with said respective members and friction applying means on said first-named member at one side of said disks, a ball-bearing between said members at the other side of said disks, a sleeve between said members one end of which coacts with said friction clutch, a ball-bearing between the other end of said sleeve and said outer member, a relatively stationary part, a ball-bearing between the latter and said outer member and between said first-named ball-bearings, and means for causing relative axial adjustment between said sleeve and said first-named member for axially adjusting the distance between said friction applying means and said sleeve.

7. In a device of the character described, the combination of an inner motion transmitting member, an outer motion transmitting member thereabout, a disk friction clutch about said first-named member at one end of said second-named member, said clutch comprising friction disks respectively rotatable with said respective members and friction applying means on said first-named member at one side of said disks, a ball-bearing between said members at the other side of said disks, a relatively stationary part, a ball-bearing between the latter and said outer member, said outer member comprising a motion transmitting shell received about said ball-bearings, a sleeve between said members one end of which coacts with said friction clutch, and means outside said shell for causing relative axial adjustment between said sleeve and said first-named member for axially adjusting the distance between said friction applying means and said sleeve.

8. In a device of the character described, the combination of a housing, a sleeve rotatable in said housing and held in endwise relation thereto, a shaft along which said sleeve is translatable, said sleeve and said shaft rotatable together, disk friction clutches in said housing about said sleeve, oppositely rotatable power transmitting members about the respective ends of said sleeve, intermediate sleeves between said respective last-named members and said first-named sleeve, the inner ends of said respective intermediate sleeves coacting with said respective pairs of disk friction clutches for adjusting the friction forces transmitted thereby, and adjusting means having manipulating means thereon respectively at the outer ends of said first-named sleeve for causing adjustments in axial directions between said second-named sleeves and said first-named sleeve for respectively adjusting said disk friction clutches.

9. In a device of the character described, the combination of a housing, an inner sleeve rotatable in said housing and held in endwise relation thereto, a shaft along which said sleeve is translatable, said sleeve and said shaft rotatable together, intermediate sleeves about the respective ends of said first-named sleeve, said intermediate sleeves rotatable with said inner sleeve and adjustable endwise with relation thereto, a pair of disk friction clutches in said housing between the inner ends of said intermediate sleeves, friction applying means between said friction clutches, control means for the latter between said friction clutches, oppositely rotatable power transmitting members about said intermediate sleeves, and manipulating means at the outer ends of said inner sleeve for adjusting said intermediate sleeves endwise.

10. In a device of the character described, the combination of a housing, a bearing at each end thereof, a pair of outer oppositely rotatable power transmitting members respectively journaled in said bearings, an inner sleeve, a shaft along which said inner sleeve is translatable, said inner sleeve and said shaft rotatable together, a pair of disk friction clutches in said housing between the inner ends of said respective power transmitting members and said inner sleeve, a pair of intermediate sleeves about the respective ends of said inner sleeve and in said pair of power transmitting members and coacting with said pair of disk friction clutches respectively and adjusting means between said intermediate sleeves and said inner sleeve for adjusting the same relatively in axial direction, said adjusting means having manipulating means respectively at the outer ends of said inner sleeve whereby to adjust said friction clutches in the inside of said housing from the outside of said housing.

11. In a device of the character described, the combination of a housing comprising outwardly oppositely extended bearings, a pair of outer oppositely rotatable power transmitting members respectively journaled in said bearings, an inner sleeve, a shaft along which said inner sleeve is translatable, said inner sleeve and said shaft rotatable together, a pair of disk friction clutches in said housing between the inner ends of said power transmitting members and said inner sleeve, a pair of intermediate sleeves about the respective ends of said inner sleeve and in said pair of power transmitting members, the inner ends of said pair of intermediate sleeves coacting with said pair of disk friction clutches respectively, and adjusting means between said inner sleeve and said intermediate sleeves respectively for adjusting the same relatively in axial direction, said adjusting means provided with manipulating means outside said housing respectively at the outer ends of said inner sleeve whereby to adjust said friction clutches in said housing from the outside of said housing, and said pair of power transmitting means comprising power transmitting shells received about said bearings.

In testimony whereof, we have hereunto signed our names.

AUGUSTUS M. SOSA.
WILLIAM G. HOELSCHER.